United States Patent
Shuang et al.

(10) Patent No.: US 10,604,599 B2
(45) Date of Patent: Mar. 31, 2020

(54) METHOD FOR GREEN SYNTHESIS OF UNIFORM- AND LARGE-PARTICLE-SIZE POLYSTYRENE PARTICLES

(71) Applicants: Nanjing University, Nanjing (CN); Nanjing University & Yancheng Academy of Environmental Protection Technology and Engineering, Yancheng (CN)

(72) Inventors: Chendong Shuang, Nanjing (CN); Weiwei Zhou, Nanjing (CN); Yunshu Wang, Nanjing (CN); Aimin Li, Nanjing (CN); Qimeng Li, Nanjing (CN); Lili Liu, Nanjing (CN); Wei Wang, Nanjing (CN); Yi Zhang, Nanjing (CN)

(73) Assignees: Nanjing University, Nanjing (CN); Nanjing University & Yancheng Academy of Environmental Protection Technology and Engineering, Yancheng (CN)

(*) Notice: Subject to any disclaimer, the term of this patent is extended or adjusted under 35 U.S.C. 154(b) by 154 days.

(21) Appl. No.: 15/991,937

(22) Filed: May 29, 2018

(65) Prior Publication Data
US 2019/0367645 A1 Dec. 5, 2019

(51) Int. Cl.
*C08F 6/18* (2006.01)
*C08F 12/08* (2006.01)
*C08K 5/01* (2006.01)
*C08K 5/14* (2006.01)
*C08K 5/23* (2006.01)
*C08K 5/09* (2006.01)

(52) U.S. Cl.
CPC ............... *C08F 12/08* (2013.01); *C08F 6/18* (2013.01); *C08K 5/01* (2013.01); *C08K 5/09* (2013.01); *C08K 5/14* (2013.01); *C08K 5/23* (2013.01); *C08F 2500/01* (2013.01); *C08F 2500/24* (2013.01)

(58) Field of Classification Search
CPC .......... C08F 12/08; C08F 112/08; C08F 6/18; C08F 212/08
See application file for complete search history.

(56) References Cited

FOREIGN PATENT DOCUMENTS

CN 106749825 A 5/2017

*Primary Examiner* — Vu A Nguyen
(74) *Attorney, Agent, or Firm* — CBM Patent Consulting, LLC

(57) ABSTRACT

A method for green synthesis of uniform- and large-particle-size polystyrene particles, comprising steps of: prepolymerizing styrene at 70□ to 75□ for 1 h to 6 h in advance while stirring, adding divinylbenzene dissolved with initiators to the styrene, and stirring for 10 min to 30 min to obtain oil phase; heating lactic acid or an aqueous solution of lactic acid to 70□ to 80□, adding the oil phase to dispersed phase by a constant-pressure device, maintaining the temperature for 2 h, heating to 80±5□ and then maintaining the temperature for 1 h, and heating to 85±5□ and then maintaining the temperature for 3 h to 6 h, to obtain polystyrene particles with a uniform particle size ranging from 0.7 mm to 2.0 mm.

9 Claims, No Drawings

METHOD FOR GREEN SYNTHESIS OF UNIFORM- AND LARGE-PARTICLE-SIZE POLYSTYRENE PARTICLES

TECHNICAL FIELD OF THE INVENTION

The present invention relates to a method for green synthesis of uniform- and large-particle-size polystyrene particles, and in particular to a method for green synthesis of uniform- and large-particle-size polystyrene particles, the dispersed phase of which can be completely degraded.

BACKGROUND OF THE INVENTION

Polystyrene resins have been attracting people's attention since they were discovered due to their advantages such as stable physical and chemical properties, easy regeneration operation and long service life. Cation-anion exchange resin prepared by the modification of polystyrene polymer particles is a kind of resin which is yielded the greatest in the world at present, and has been widely applied in fields such as water softening, purification of drugs and foods, material recycling, reclamation of pollutants and catalysis, with great influence on the development of the electric power industry, the chemical engineering, the pharmaceutical industry and the military industry.

At present, polystyrene is usually prepared by suspension polymerization. Generally, the oil phase containing styrene and divinylbenzene as main monomers is added to an aqueous solution dissolved with dispersants and salts (the dispersed phase) for suspension polymerization in the presence of initiators. The composition of the dispersants and the control of stirring have great influence on the particle size of polymers and the particle size distribution. At present, as industrial dispersants, synthetic dispersants such as gelatin, polyvinyl alcohol, polyvinylpyrrolidone, hydroxymethyl cellulose, hydroxyethyl cellulose, sodium dodecyl benzene sulfonate and sodium lignin sulfonate are used. Such dispersants are short in service life and cannot be reused. As a result, a large amount of wastewater containing a high content of dispersants and a high content of salts is produced. Furthermore, it is difficult to biodegrade such dispersants and this causes great harm to the environment. Generally, the particle size of polymers can be distributed normally between 0.3 mm and 0.9 mm, by adjusting the composition of dispersants in the dispersed phase and the concentration thereof, accompanied by the control of the stirring speed. However, during the treatment of large-flow water, resin particles of a large particle size facilitate the increase of flow. Unfortunately, those traditional dispersants are inappropriate for the preparation of resins of a uniform and large particle size (>1 mm). At present, there has been no any report about methods for synthesis of uniform- and large-particle-size particles. For example, by the method disclosed in the authorized patent ZL201210486496.9, entitled "PREPARATION METHOD OF CROSSLINKED POLYSTYRENE RESIN MICROSPHERES WITH NARROW PARTICLE SIZE DISTRIBUTION", relatively uniform polystyrene particles can be prepared. However, their particle size is adjustable between 53 μm and 350 μm. Meanwhile, during the polymerization, the dispersed phase in the traditional synthesis methods usually contains gelatin and a high concentration of inorganic salts such as sodium chloride, and consequently, the dispersed phase at the end of synthesis cannot be recycled. The preparation process is not green and environmentally friendly. The development of this industry is highly restricted.

SUMMARY OF THE INVENTION

1. Technical Problems to be Solved

The present invention is designed to solve the present problems that it is difficult to increase the particle size of the polystyrene particle resin and improve the uniformity thereof, that a large amount of wastewater will be produced by the preparation process, and that it is difficult to reuse the dispersants and this causes harm to the environment. By the change in the dispersed phase and the development of the preparation process, a method for efficient and green synthesis of uniform- and large-particle-size polystyrene particles is provided.

2. Technical Solution

The present invention employs the following technical solution: a method for green synthesis of uniform- and large-particle-size polystyrene particles, comprising steps of:

(1) heating styrene to 70□ to 75□ and prepolymerizing for 1 h to 6 h;

(2) adding divinylbenzene dissolved with benzoyl peroxide or azodiisobutyronitrile into the styrene as processed in the step (1), adding or not adding one or more of methylbenzene, isobutanol, 200# solvent oil, cyclohexanol, liquid paraffin and n-heptane as porogen, stirring for 10 min to 30 min to obtain oil phase;

(3) heating lactic acid or an aqueous solution of lactic acid to 70□ to 80□ to obtain dispersed phase; and (4) adding the oil phase obtained in the step (2) into the dispersed phase by a constant-pressure extrusion device while stirring at a speed of 10 r/min to 22 r/min, maintaining the temperature at 76±5□ for 2 h, heating to 80±5□ and then maintaining the temperature for 1 h, heating to 85±5□ and then maintaining the temperature for 3 h to 6 h, stopping stirring, and collecting the dispersed phase, i.e., polystyrene particles with a uniform particle size.

As a preferred solution of the present invention, in the step (1), the molecular weight of polystyrene is monitored in real time, and heating is stopped when polystyrene of molecular weight 500 to 4000 Da is preliminarily formed by the polymerization of styrene.

Further, heating is stopped when polystyrene of molecular weight 2000 Da is preliminarily formed by the polymerization of styrene.

As another preferred solution of the present invention, the constant-pressure device in the step (4) is a constant-pressure funnel or a constant-pressure pump.

Further, in this solution, the obtained polystyrene particles are controlled in a size ranging from 0.7 mm to 2.0 mm by adjusting the pressure and caliber of the used constant-pressure funnel or constant-pressure pump.

As still another preferred solution of the present invention, after the polymerization in the step (4), the proportioning action and the operations in the step (1), the step (2) and the step (4) are repeated for 1 to 20 times, and adding the obtained oil phase to the previously-used and collected dispersed phase dropwise.

Further, in this solution, after the polymerization in the step (4), the proportioning action and the operations in the step (1), the step (2) and the step (4) are repeated for 5 times.

Further, in this solution, lactic acid in the dispersed phase or the reused dispersed phase is degraded within 1 to 40 days.

Further, lactic acid in the dispersed phase or the reused dispersed phase is treated with an aeration process so that the lactic acid is completely degraded within 8 h to 36 h.

3. Beneficial Effects

Compared with the prior art, the present invention has the following advantages.

(1) By the method for green synthesis of uniform- and large-particle-size polystyrene particles disclosed in the present invention, linear polymer polystyrene of molecular weight 500 to 4000 Da is preliminarily formed by the polymerization of styrene by controlling the heating time and the heating temperature as described in the step (1). This step prevents the stirring in the subsequent reaction from breaking the oil phase into tiny oil droplets.

(2) By the method for green synthesis of uniform- and large-particle-size polystyrene particles disclosed in the present invention, the dispersed phase composed of gelatin, polyvinyl alcohol and inorganic salts is replaced by the lactic acid, as described in the step (3). Firstly, the traditional dispersed phase cannot be reused, while the dispersed phase composed of lactic acid or composed of lactic acid and water can be reused for 1 to 20 times. Secondly, at the end of reuse, the reused dispersed phase may be or may be not treated with an aeration process. If it is to be treated with an aeration process, the lactic acid will be completely degraded within 8 h to 36 h. If it is not to be treated with an aeration process, the lactic acid will be completely degraded within 1 to 40 days. No harm to the environment will be caused. Therefore, this method is a green and environmentally friendly synthesis method.

(3) By the method for green synthesis of uniform- and large-particle-size polystyrene particles disclosed in the present invention, by adding the oil phase dropwise by a constant-pressure funnel, the particle size of the polystyrene particles can be controlled by adjusting the pressure and caliber of the constant-pressure funnel.

By adjusting the size of the oil droplets added to the lactic acid dispersed phase dropwise, spherical polystyrene particles with a uniform particle size ranging from 0.7 mm to 2.0 mm can be obtained by polymerization.

DETAILED DESCRIPTION OF THE INVENTION

The technical solutions of the present invention will be further described below in details by specific implementations.

Embodiment 1

19.4 g of styrene was added in a three-necked flask, stirred, heated to 72□ and maintained for 2 h. 0.3 g of initiator benzoyl peroxide was added in 4.6 g of divinylbenzene (63%), stirred, added in the styrene, stirred and uniformly mixed, added with 12 g of isobutanol, stirred again to obtain oil phase which was collected in a constant-pressure funnel having a caliber of 1.5 mm for future use. The three-necked flask was cleaned; and 50 g of lactic acid was added in the three-necked flask, heated to 75□, and stirred. The revolving speed was adjusted to about 20 r/min, and the valve of the constant-pressure funnel was adjusted so that the oil phase was added in the lactic acid dropwise. At the end of adding the oil phase dropwise, the solution was maintained for 2 h, heated to 80□ and then maintained for 1 h, heated to 85□ and then maintained for 3 h. After the solution was cooled, stirring was stopped. The dispersed phase was collected to obtain large-particle-size polystyrene particles with a particle size of 1.7 mm to 2.0 mm.

The proportioning action and the operations are repeated for 7 times, with the difference that the oil phase was add in the used dispersed phase dropwise to obtain large-particle-size polystyrene particles with a particle size of 1.7 mm to 2.0 mm at the end of polymerization, and the lactic acid, when placed outdoor, was completely degraded within 36 days.

Embodiment 2

50 g of styrene was added in a three-necked flask, stirred, heated to 70□ and maintained for 6 h. 0.8 g of initiator benzoyl peroxide was added in 11.5 g of divinylbenzene (63%), stirred, added in the styrene, stirred and uniformly mixed to obtain oil phase which was collected in two constant-pressure funnels each having a caliber of 1.2 mm for future use. 160 g of lactic acid was added in the four-necked flask, added with 40 g of deionized water, heated to 75□, and stirred. The revolving speed was adjusted to about 15 r/min, and the valve of the constant-pressure funnels was adjusted so that the oil phase was added in the lactic acid dropwise. At the end of adding the oil phase dropwise, the solution was maintained for 2 h, heated to 82□ and then maintained for 1 h, heated to 88□ and then maintained for 3 h. After the solution was cooled, stirring was stopped. The dispersed phase was collected to obtain large-particle-size polystyrene particles with a particle size of 1.4 mm to 1.6 mm.

The proportioning action and the operations are repeated for 20 times, with the difference that the oil phase was add in the used dispersed phase dropwise to also obtain large-particle-size polystyrene particles with a particle size of 1.4 mm to 1.6 mm at the end of polymerization. The dispersed phase was treated with an aeration process, and the lactic acid was completely degraded within 9 h.

Embodiment 3

97 g of styrene was added in a three-necked flask, stirred, heated to 75□ and maintained for 1 h. 1.5 g of initiator benzoyl peroxide was added in 23 g of divinylbenzene (63%), stirred, added in the styrene, stirred, added with 60 g of isobutanol and uniformly mixed to obtain oil phase which was collected in two constant-pressure funnels each having a caliber of 0.6 mm for future use. 400 g of lactic acid was added in the four-necked flask, heated to 75□, and stirred. The revolving speed was adjusted to about 22 r/min, and the valve of the constant-pressure funnels was adjusted so that the oil phase was added in the lactic acid dropwise. At the end of adding the oil phase dropwise, the solution was maintained for 2 h, heated to 84□ and then maintained for 1 h, heated to 89□ and then maintained for 3 h. After the solution was cooled, stirring was stopped. The dispersed phase was collected to obtain large-particle-size polystyrene particles with a particle size of 0.7 mm to 0.9 mm.

The proportioning action and the operations are repeated for 3 times, with the difference that the oil phase was add in the used dispersed phase dropwise to also obtain large-particle-size polystyrene particles with a particle size of 0.7 mm to 0.9 mm at the end of polymerization. The dispersed phase was treated with an aeration process, and the lactic acid was completely degraded within 15 h.

Embodiment 4

Pilot-scale production was conducted in a manufacturing enterprise in Jiangsu province. 1,940 g of styrene was added in a 5 L kettle, stirred, heated to 72☐ and maintained for 5 h. 30 g of initiator benzoyl peroxide was added in 460 g of divinylbenzene (63%), stirred, added in the styrene, stirred and uniformly mixed to obtain oil phase. The bottom valve was opened, and the oil phase was collected in ten constant-pressure funnels each having a caliber of 1.2 mm for future use. 8,000 g of lactic acid was added in a 25 L kettle, added with 2,000 g of deionized water, heated to 74☐, and stirred. The revolving speed was adjusted to about 10 r/min, and the valve of each constant-pressure funnel was adjusted so that the oil phase was added in the lactic acid dropwise. At the end of adding the oil phase dropwise, the solution was maintained for 2 h, heated to 80☐ pressure and then maintained for 1 h, heated to 86☐ pressure and then maintained for 3 h. After the solution was cooled, stirring was stopped. The bottom valve was opened to obtain large-particle-size polystyrene particles with a particle size of 1.4 mm to −1.8 [User1]mm. The dispersed phase was treated with an aeration process, and the lactic acid was completely degraded within 36 h.

It should be understood by a person of ordinary skill in the art that the above embodiments are provided merely for explaining the present invention, not for limiting the present invention, and any changes and modifications to those embodiments shall fall into the scope defined by the appended claims of the present invention without departing from the spirit of the present invention.

What is claimed is:

1. A method for green synthesis of uniform- and large-particle-size polystyrene particles, comprising steps of:
   (1) heating styrene to 70° C. to 75° C. and prepolymerizing for 1 h to 6 h;
   (2) adding divinylbenzene dissolved with benzoyl peroxide or azodiisobutyronitrile into the styrene as processed in the step (1), adding or not adding one or more of methylbenzene, isobutanol, 200# solvent oil, cyclohexanol, liquid paraffin and n-heptane as porogen, stirring for 10 min to 30 min to obtain oil phase;
   (3) heating lactic acid or an aqueous solution of lactic acid to 70° C. to 80° C. to obtain dispersed phase; and
   (4) adding the oil phase obtained in the step (2) into the dispersed phase by a constant-pressure extrusion device while stirring at a speed of 10 r/min to 22 r/min, maintaining the temperature at 76±5° C. for 2 h, heating to 80±5° C. and then maintaining the temperature for 1 h, heating to 85±5° C. and then maintaining the temperature for 3 h to 6 h, stopping stirring, and collecting the dispersed phase, comprising polystyrene particles with a uniform particle size.

2. The method for green synthesis of uniform- and large-particle-size polystyrene particles according to claim 1, characterized in that, in the step (1), the molecular weight of polystyrene is monitored in real time, and heating is stopped when polystyrene of molecular weight 500 to 4000 Da is preliminarily formed by the polymerization of styrene.

3. The method for green synthesis of uniform- and large-particle-size polystyrene particles according to claim 2, characterized in that heating is stopped when polystyrene of molecular weight 2000 Da is preliminarily formed by the polymerization of styrene.

4. The method for green synthesis of uniform- and large-particle-size polystyrene particles according to claim 1, characterized in that the constant-pressure device in the step (4) is a constant-pressure funnel or a constant-pressure pump.

5. The method for green synthesis of uniform- and large-particle-size polystyrene particles according to claim 4, characterized in that the obtained polystyrene particles are controlled in a size ranging from 0.7 mm to 2.0 mm by adjusting the pressure and caliber of the used constant-pressure funnel or constant-pressure pump.

6. The method for green synthesis of uniform- and large-particle-size polystyrene particles according to claim 1, characterized in that, after the polymerization in the step (4), the operations in the step (1), the step (2) and the step (4) are repeated for 1 to 20 times, and adding the obtained oil phase to the previously-used and collected dispersed phase dropwise.

7. The method for green synthesis of uniform- and large-particle-size polystyrene particles according to claim 6, characterized in that, after the polymerization in the step (4), the operations in the step (1), the step (2) and the step (4) are repeated for 5 times.

8. The method for green synthesis of uniform- and large-particle-size polystyrene particles according to claim 1, characterized in that lactic acid in the dispersed phase or the reused dispersed phase is degraded within 1 to 40 days.

9. The method for green synthesis of uniform- and large-particle-size polystyrene particles according to claim 8, characterized in that lactic acid in the dispersed phase or the reused dispersed phase is treated with an aeration process so that the lactic acid is completely degraded within 8 h to 36 h.

* * * * *